United States Patent
Patil

(10) Patent No.: US 8,839,432 B1
(45) Date of Patent: Sep. 16, 2014

(54) METHOD AND APPARATUS FOR PERFORMING A REPUTATION BASED ANALYSIS ON A MALICIOUS INFECTION TO SECURE A COMPUTER

(75) Inventor: Deepak Patil, Nashik (IN)

(73) Assignee: Symantec Corporation, Mountain View, CA (US)

( * ) Notice: Subject to any disclaimer, the term of this patent is extended or adjusted under 35 U.S.C. 154(b) by 433 days.

(21) Appl. No.: 12/752,727

(22) Filed: Apr. 1, 2010

(51) Int. Cl.
*G06F 21/00* (2013.01)
*G06F 21/56* (2013.01)

(52) U.S. Cl.
CPC ................... *G06F 21/566* (2013.01)
USPC .............................. 726/24; 713/188

(58) Field of Classification Search
USPC ...................... 726/22–25; 713/188
See application file for complete search history.

(56) References Cited

U.S. PATENT DOCUMENTS

| | | | |
|---|---|---|---|
| 7,647,636 B2 * | 1/2010 | Polyakov et al. | 726/24 |
| 2006/0212931 A1 * | 9/2006 | Shull et al. | 726/10 |
| 2006/0253583 A1 * | 11/2006 | Dixon et al. | 709/225 |
| 2008/0141366 A1 * | 6/2008 | Cross et al. | 726/21 |
| 2008/0209552 A1 * | 8/2008 | Williams et al. | 726/22 |
| 2008/0234999 A1 * | 9/2008 | Cohen et al. | 703/26 |
| 2009/0049549 A1 * | 2/2009 | Park et al. | 726/22 |
| 2009/0249484 A1 * | 10/2009 | Howard et al. | 726/24 |
| 2011/0067101 A1 * | 3/2011 | Seshadri et al. | 726/22 |

* cited by examiner

*Primary Examiner* — Gilberto Barron, Jr.
*Assistant Examiner* — Abdulhakim Nobahar
(74) *Attorney, Agent, or Firm* — Wilmer Cutler Pickering Hale and Dorr LLP

(57) ABSTRACT

A method and apparatus for performing a reputation based analysis on a malicious infection to secure a computer. In one embodiment, the method includes monitoring application activity occurring at computers, generating reputation information associated with the application activity, in response to a malicious infection to at least one of the computers, examining the reputation information to access unreputed portions of the application activity that occurred at the at least one of the computers and determining a malicious signature based on the unreputed portions of the application activity.

17 Claims, 8 Drawing Sheets

METHOD AND APPARATUS FOR PERFORMING A REPUTATION BASED ANALYSIS ON A MALICIOUS INFECTION TO SECURE A COMPUTER

BACKGROUND OF THE INVENTION

1. Field of the Invention

Embodiments of the present invention generally relate to a computer security system and, more particularly, to a method and apparatus for performing a reputation based analysis on a malicious infection to secure a computer.

2. Description of the Related Art

Widespread Internet usage by small to large organizations results in an increase in computer-related attacks. Various malicious software programs (e.g., viruses, Trojan horses, worms and/or the like) cause many of these related computer attacks. These malicious software programs may be transmitted (i.e. downloaded) to a vulnerable computer without user consent and/or knowledge as executable programs, email attachments, multimedia files (e.g., video files, audio files and/or the like), malicious HTML code on web pages and/or the like.

The malicious software programs may exert control over an operating system and modify various files (e.g., system registry entries) and/or settings (e.g., background color, screen saver and/or the like) in order to disrupt normal operation. The malicious software programs may also exploit the user computer for illegitimate purposes. For example, a certain malicious software program may misappropriate sensitive data, such as intellectual property, customer data, medical histories, financial records, purchase orders, legal documents, privileged and/or confidential information, social security numbers, addresses, pictures, documents, contacts and/or the like.

Occasionally, a user may be enticed and/or redirected to a website that hosts such malicious software programs. The user may be enticed by various techniques including an email or a posting on social networking websites (e.g., Orkut, Facebook, MySpace and/or the like) that includes a link to the malicious website. The user may also be enticed through a browser window that misrepresents legitimate computer operations, such as anti-virus security scans or operating system messages.

Typical security software is designed to detect the malicious software programs and remediate any malicious activities, such as network connectivity disruption or file deletions. The security software utilizes signatures for performing the malware detection. Such signatures are created using reputed side effects. In addition, because the development of these signatures requires a significant amount of time, the malicious software programs are able to disrupt many computers before detection and remediation. Moreover, signature development is not automatic and relies on numerous manual operations.

Therefore, there is a need in the art for a method and apparatus for performing a reputation based analysis on a malicious infection to secure a computer.

SUMMARY OF THE INVENTION

Various embodiments of the present invention generally a method for performing a reputation based analysis on a malicious infection to secure a computer. In one embodiment, the method for performing a reputation based analysis on a malicious infection to secure a computer includes monitoring application activity occurring at computers, generating reputation information associated with the application activity, in response to a malicious infection to at least one of the computers, examining the reputation information to access unreputed portions of the application activity that occurred at the at least one of the computers and determining a malicious signature based on the unreputed portions of the application activity.

In some embodiments, the application activity and the reputation information is transformed into the malicious signature. In some embodiments, a reputation value for each side effect of the application activity is determined. In some embodiments, each reputation value of the reputation information is compared with a metric for evaluating the application activity to identify the unreputed portions of the application activity.

In some embodiments, the malicious signature is distributed amongst the computers, wherein the malicious signature is used to detect malware variants. The method of claim 1, wherein determining the malicious signature further comprises identifying the malicious infection at another computer based on the malicious signature. In some embodiments, the malicious signature includes an intersection between the unreputed portions of the application activity.

In another embodiment, an apparatus for performing a reputation based analysis on a malicious infection to secure a computer includes means for monitoring application activity occurring at computers, means for generating reputation information associated with the application activity, means for examining the reputation information, in response to a malicious infection to at least one of the computers, to access unreputed portions of the application activity that occurred at the at least one of the computers and means for correlating the unreputed portions of the application activity to produce a malicious signature.

In some embodiments, the apparatus further includes means for transforming the application activity and the reputation information into the malicious signature. In some embodiments, the apparatus further includes means for determining a reputation value for each side effect of the application activity. In some embodiments, the apparatus further includes means for comparing each reputation value of the reputation information with a metric for evaluating the application activity to identify the unreputed portions of the application activity. In some embodiments, the apparatus further includes means for distributing the malicious signature amongst the computers, wherein the malicious signature is used to detect malicious software variants. In some embodiments, the apparatus further includes means for identifying the malicious infection at another computer based on the malicious signature.

In yet another embodiment, a computer-readable-storage medium comprising one or more processor-executable instructions that, when executed by at least one processor, causes the at least one processor to monitor application activity occurring at computers, generate reputation information associated with the application activity, examine the reputation information, in response to a malicious infection to at least one of the computers, to access unreputed portions of the application activity that occurred at the at least one of the computers and determine a malicious signature based on the unreputed portions of the application activity, wherein the malicious signature is used to detect variants of the malicious infection.

In some embodiments, the one or more processor-executable instructions that, when executed by the at least one processor, causes the at least one processor to distribute the malicious signature amongst the computers, wherein the malicious signature is used to detect malware variants. In some embodiments, the one or more processor-executable instructions that, when executed by the at least one processor, causes the at least one processor to identify the malicious infection at another computer based on the malicious signature. In some embodiments, the one or more processor-executable instructions that, when executed by the at least one processor, causes the at least one processor to compare each reputation value of the reputation information with a metric for evaluating the application activity to identify the unreputed portions of the application activity.

In some embodiments, the one or more processor-executable instructions that, when executed by the at least one processor, causes the at least one processor to correlate the unreputed portions of the application activity to produce the malicious signature. In some embodiments, the one or more processor-executable instructions that, when executed by the at least one processor, causes the at least one processor to compute an intersection between the unreputed portions of the application activity. In some embodiments, the one or more processor-executable instructions that, when executed by the at least one processor, causes the at least one processor to transform the application activity and the reputation information into the malicious signature.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present disclosure provide security for a user computer against malicious infections by producing malicious signatures from unreputed side effects (e.g., file creations, system registry entries and/or the like). In some embodiments, various software modules identify the unreputed side effects based on application activity that is communicated by a plurality of user computers infected with malware. By identifying an intersecting grouping of the unreputed side effects, the various software modules may determine an appropriate malicious signature for distribution amongst the plurality of user computers in order to detect the malware and/or any known or unknown malware variants.

Figure 1:
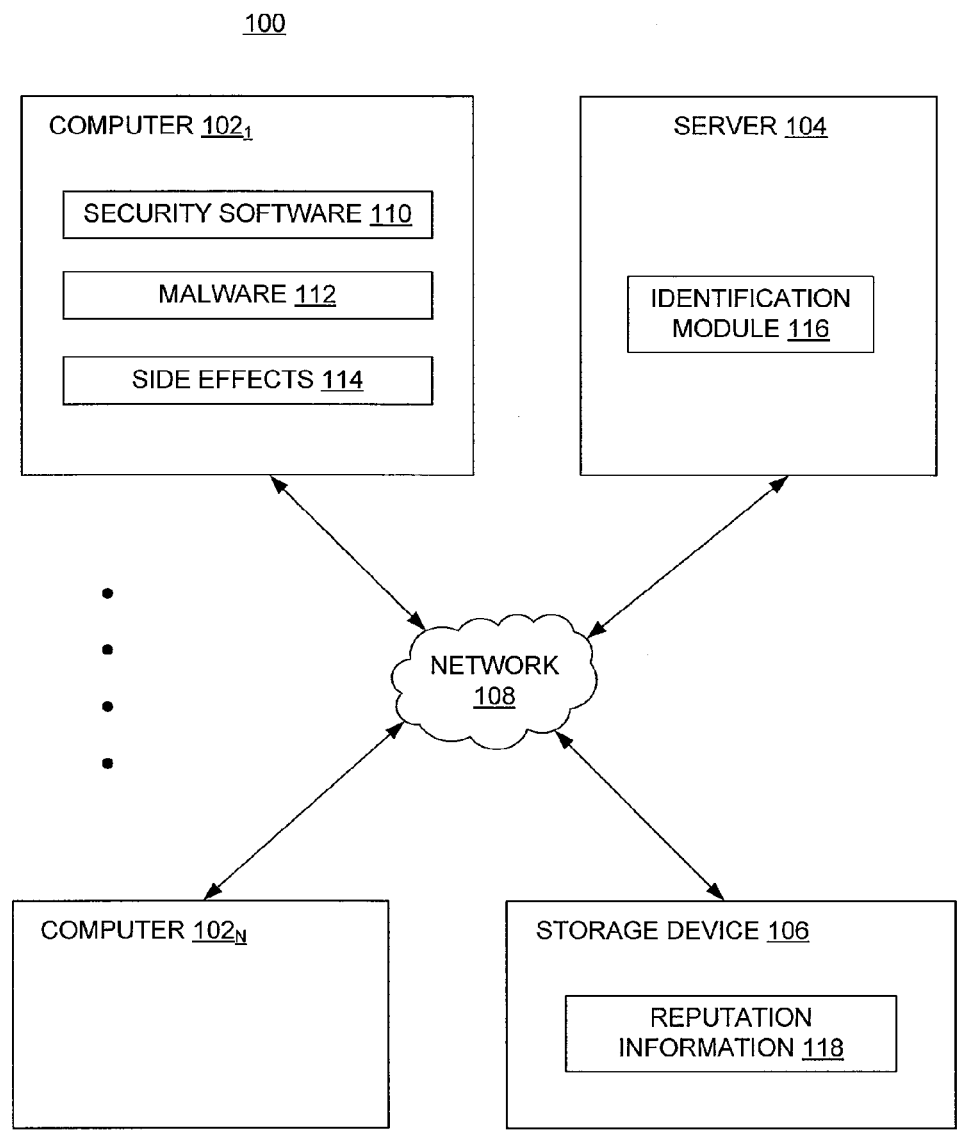
FIG. 1 is a system for performing a reputation based analysis on a malicious infection to secure a computer, according to one or more embodiments.

FIG. 1 is a block diagram of a system 100 for performing a reputation based analysis on a malicious infection to secure a computer, according to one or more embodiments. The system 100 may includes a plurality of user computers 102, a server 104 and a storage device 106 where each is coupled to each other through a network 108.

Each of the user computers 102 is a type of computing device (e.g., a laptop, a desktop, a Personal Digital Assistant (PDA) and/or the like), such as those generally known in the art. In one embodiment, one or more particular computers 102 includes malware 110 having malicious software code that destroys valuable computer data and/or disrupts computer operations. A hacker may utilize the computer 102 to redistribute the malware 112 and infect one or more additional computers 102. As soon as the user computer 102 executes the malicious software code (e.g., spyware, viruses, rootkits and/or the like), the malware 112 compromises computer security, which causes critical operation disruption and/or sensitive data misappropriation (e.g., passwords, login names, credit card details and/or the like). To remediate malicious infections, security software 110 running within the user computer 102 communicates side effects 114 associated with the malware 110 to the server 104 to produce malicious signatures as explained further below.

The server 104 is also a type of computing device (e.g., a laptop, a desktop, a Personal Digital Assistant (PDA) and/or the like) known to one of ordinary skill in the art having the benefit of this disclosure. The server 104 includes various data and software modules, such as a determination module 116 as explained further below. Generally, the server 104 monitors application activity (i.e., the side effects 114) at the plurality of user computers 102 in order to determine a malicious signature that is used for detecting malicious infections including any unknown or known malware variants.

The storage device 106 generally includes various hardware and/or software that are configured to manage storage resources for the system 100. The storage device 106 may include one or more data storage drives (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) for one or more computing devices, such as the server 104. In one embodiment, the storage device 106 includes one or more database systems, which may maintain various data, such as reputation information 118. As explained further below, the reputation information 118 includes reputation values for each portion of the application activity that occurred on the plurality of user computers 102.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet using various communications infrastructure such as Ethernet, WiFi, WiMax, General Packet Radio Service (GPRS), and the like.

Figure 2:
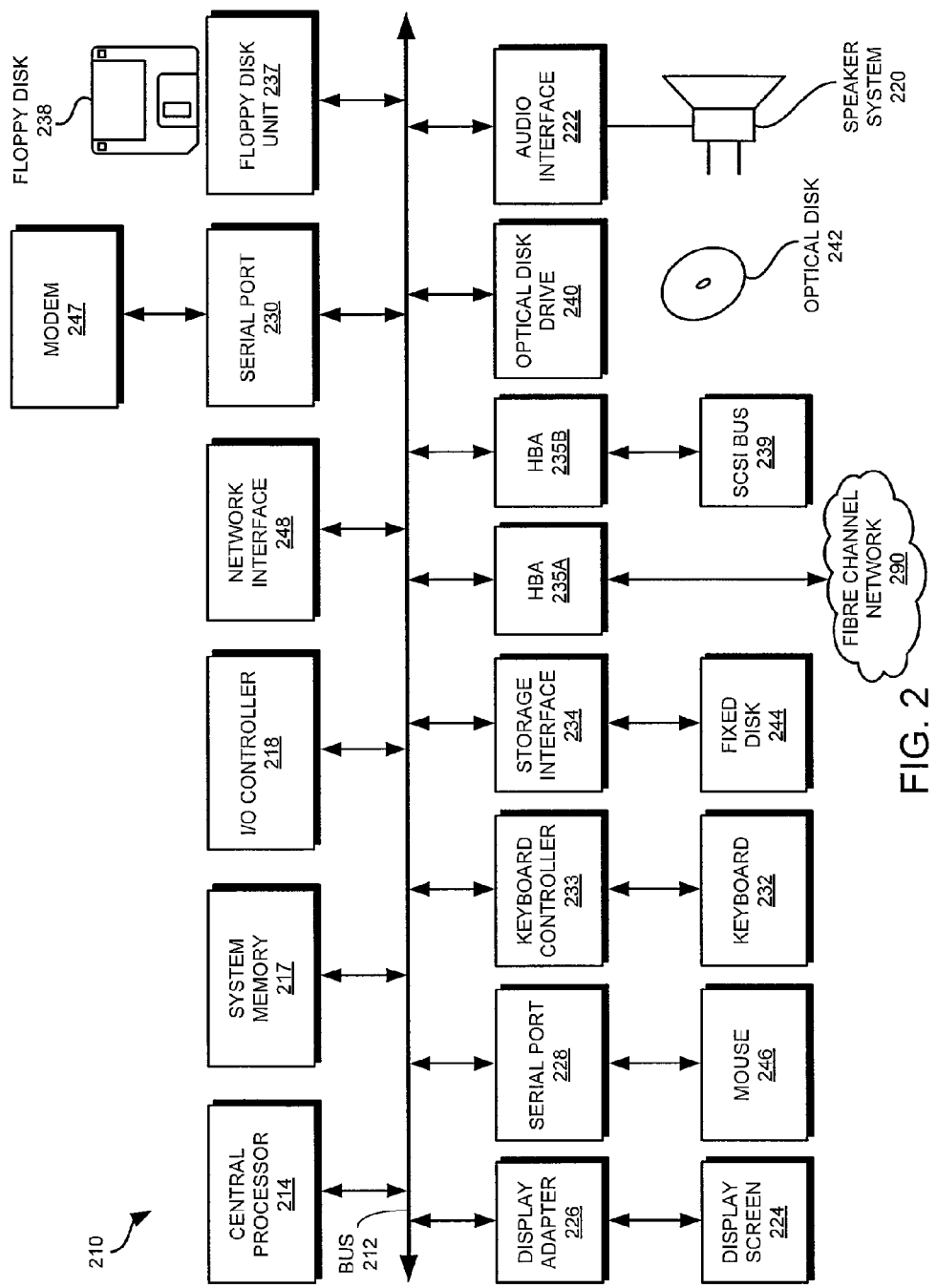
FIG. 2 is a block diagram of a suitable computer for implementing the present disclosure, according to one or more embodiments.

FIG. 2 is a block diagram of a computer system 210 suitable for implementing the present disclosure. This system 210 is representative of a computer system that can be used to implement the attack computer 102 and/or the user computer 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
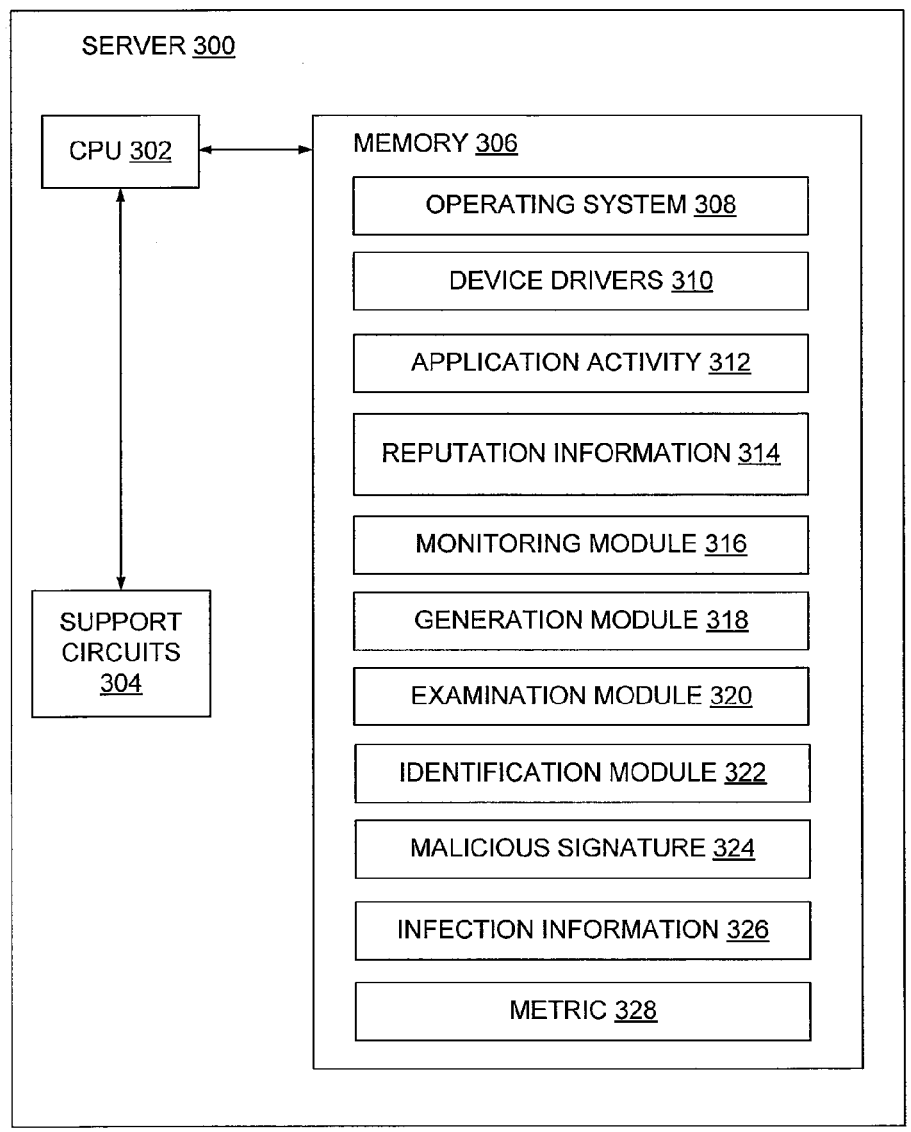
FIG. 3 is a computer for performing a reputation based analysis on a malicious infection to secure a computer, according to one or more embodiments.

FIG. 3 is a block diagram of a computer 300 for detecting legitimate computer operation misrepresentation according to various embodiments.

The computer 300 is a type of computing device (e.g., a laptop, a desktop, a Personal Digital Assistant (PDA) and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like.

The memory 306 includes various software packages, such as an operating system 308, one or more device drivers 310, a monitoring module 316, a generation module 318, an examination module 320 and an determination module 322. The memory 306 further includes various data, such as application activity 312, reputation information 314, a malicious signature 324, infection information 326 and a metric 342. The memory 306 also includes programming threads (i.e., processes) for the various software packages and objects for modeling the various data, which are built and instantiated through the operating system 308.

The operating system 308 generally manages various computer resources (e.g., network resources, data storage resources, file system resources and/or the like). The operating system 308 is configured to execute operations on one or more hardware and/or software devices, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a Network Interface Card (NIC) card to communicate data to another computer as explained further below.

When the operating system 308 executes any type of application software, various related operations are performed on the computer 300. As examples, one or more files may be created or metadata associated with the one or more files may be modified. Furthermore, a local or network file system may be backed up or restored using the application software. In some embodiments, the application activity 312 includes information describing the related operations associated with the execution of the application software. For example, the application activity 312 may refer to various side effects and/or footprints, such as system registry entries, file names, configuration file (e.g., INI/host files) entries and/or the like, that occurred on one or more computers (e.g., the computer 102 of FIG. 1).

In some embodiments, the reputation information 314 includes reputation values that are assigned to each portion of the application activity 312. A reputation value for a side effect may be based on various factors, such as a number of computers having the side effect, a number of trusted software programs having the side effect, a computer hygiene score and/or the like. Each reputation value represents a probability that a certain portion of the application activity 312 includes malicious activity. A high reputation value indicates a strong likelihood that the certain portion does not include any side effects caused by malicious software code (e.g., the malware 112 of FIG. 1). A low reputation value or lack thereof indicates a strong likelihood that the certain portion includes the side effects caused by the malicious software code. A side effect having no reputation value constitutes an unreputed portion of the application activity 312.

In some embodiments, the monitoring module 316 includes software code (e.g., processor executable instructions) stored in the memory 306 and executed by the CPU 302. The monitoring module 326 receives side effects being reported by one or more computers (e.g., the computers 102 of FIG. 1). The monitoring module 316 aggregates and the stores the reported side effects as the application activity 312. Each reported side effect includes an identifier for a source computer amongst the one or more computers. For example, the monitoring module 316 creates a snapshot of local file systems at each of the computers and stores any changes as the application activity 312.

In some embodiments, the generation module 318 includes software code (e.g., processor executable instructions) stored in the memory 306 and executed by the CPU 302. The generation module 318 accesses the application activity 312 and retrieves each portion (i.e., each side effect). As soon as the monitoring module 316 stores a side effect, the generation module 318 determines and assigns a reputational value according to one embodiment. The generation module 318 subsequently stores the reputation value in the reputation information 314.

In some embodiments, the examination module 320 includes software code (e.g., processor executable instructions) stored in the memory 306 and executed by the CPU 302. In response to one or more malicious infections, the examination module 320 compares the application activity 312 with the reputation information 314 to identify one or more unreputed portions or side effects that occurred on one or more infected computers. An unreputed portion, generally, includes one or more side effects having a very low reputational value or a lack thereof. The examination module 320 communicates the one or more unreputed portions to the determination module 322 as explained further below.

In some embodiments, the determination module 322 includes software code (e.g., processor executable instructions) stored in the memory 306 and executed by the CPU 302. The determination module 322 is configured to correlate the unreputed portions of the application activity 312 to produce the malicious signature 324. As explained further below, the determination module 322 identifies one or more side effects that occurred on each and every infected user computer. Since the identified side effects consistently occur for a same malicious infection, such side effects may be used to identify the malware or a malware variant causing the same malicious infection.

In some embodiments, the malicious signature 324 includes information for identifying malware (e.g., the malware 112 of FIG. 1) as well as any variants. A malware variant generally refers to malicious software code that similar functionality as the malware. Such malware variants produce one or more identical side effects as the malware. As such, the malicious signature includes a set or grouping of side effects that are associated with the malware as well as any malware variants. The malicious signature 324 may include one or more side effects intersected each and every one of the unreputed portions of the application activity 312. The malicious signature 324 may also be used to create software code (e.g., a cleanup script/routine) for identifying the malware and/or any variants on other computers.

In some embodiments, the infection information 326 indicates one or more malicious infections at one or more of the user computers (e.g., the user computers 102 of FIG. 1). The infection information 326 includes identifiers for each user computer potentially infected with malicious software code. In response to a particular number of malicious infections, the examination module proceeds to access the application activity 312 and extract the unreputed side effects.

In some embodiments, the metric 328 includes information describing a technique for evaluating reputational values for side effects. The metric 328 generally refers to one or more pre-defined threshold values that are compared with the reputation information 314. As an example, a pre-defined threshold may be configured to identify the unreputed portions of the application activity 312. If a particular reputational value falls below the pre-defined threshold, then one or more associated side effects are considered to be unreputed. For instance, one or more side effects having no reputation value may constitute an unreputed portion of the application activity 312.

Figure 4:
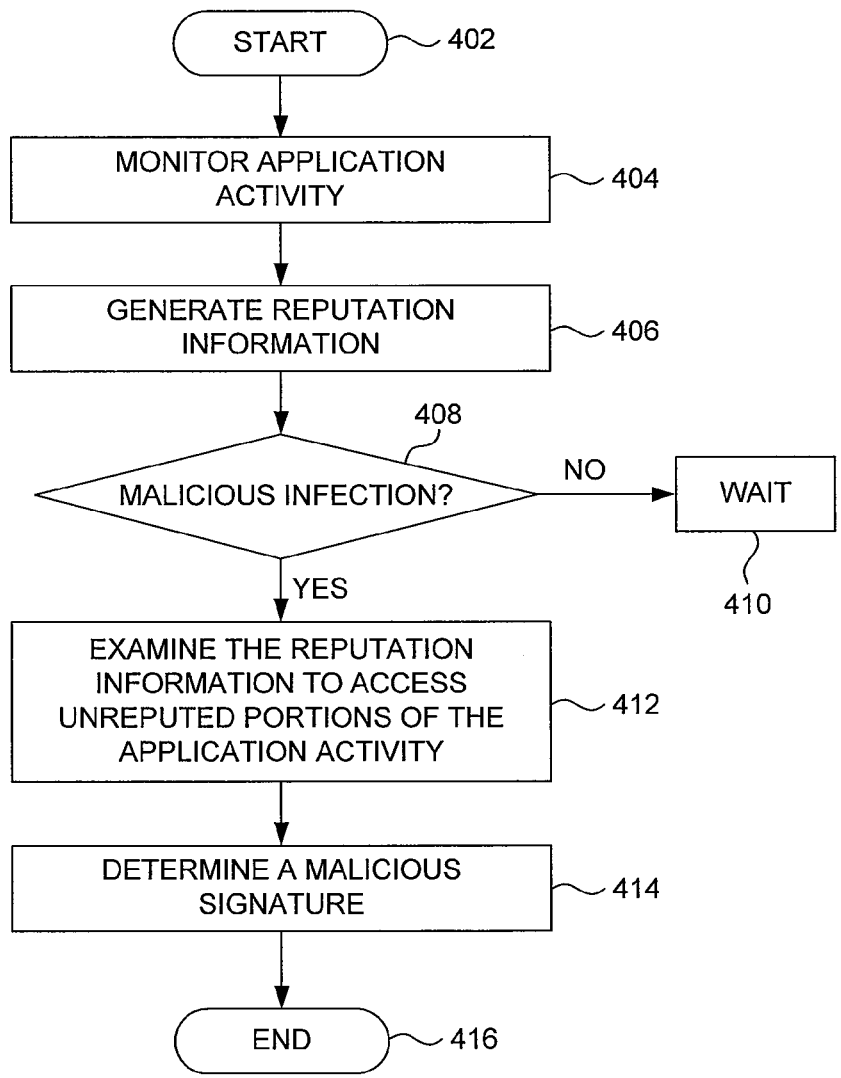
FIG. 4 is a method for performing a reputation based analysis on a malicious infection to secure a computer, according to one or more embodiments.

FIG. 4 is a method 400 for performing a reputation based analysis on a malicious infection to secure a computer, according to one or more embodiments. Various software modules cooperate to perform each and every step of the method 400 as explained further below. In some embodiments, instructions for the method 400 are recalled from memory and executed by one or more processors in order to transform application activity and reputation information into a malicious signature for identifying malware.

The method 400 starts at step 402 and proceeds to step 404. At step 404, application activity is monitored. In some embodiments, a monitoring module (e.g., the monitoring module 316 of FIG. 3) receives side effects (e.g., the side effects 114 of FIG. 1) from user computers (e.g., the computers 102) throughout a network. The monitoring module 316 aggregates and stores these side effects as the application activity (e.g., the application activity 312 of FIG. 3).

At step 406, reputation information is generated. In some embodiments, a generation module (e.g., the generation module 318 of FIG. 3) accesses the application activity and assigns a reputational value to each side effect. The generation module stores these assignments as the reputation information (e.g., the reputation information 118 of FIG. 1 or the reputation information 314 of FIG. 3). As more side effects are received by the monitoring module, the generation module updates the reputation information with additional reputation values.

At step 408, a determination is made as to whether one or more computers are infected with malware. If none of the computers are infected, the method 400 proceeds to step 410. At step 410, the method 400 waits. If, on the other hand, there is a malicious infection at the one or more computers, the method 400 proceeds to step 412. In some embodiments, infection information (e.g., the infection information 326 of FIG. 3) includes various attributes related to potential malicious infections at the user computers. For example, the infection information may indicate a hash value (e.g., an MD5 hash value) associated with a particular malicious infection as well as an identifier for an infected user computer. By examining infection information, an examination module (e.g., the examination module 320 of FIG. 3) determines a number of malicious infections. If such a number exceeds a pre-defined threshold, the examination module proceeds to step 412 and performs a cleanup action. Otherwise, the examination module waits for additional malicious infections.

At step 412, the reputation information is examined to access unreputed portions of the application activity. In some embodiments, the examination module (e.g., the examination module 320 of FIG. 3) evaluates the reputational values and extracts the unreputed portions from the application activity. In some embodiments, each unreputed portion includes one or more side effects that occurred on an infected user computer. In some embodiments, the examination module compares each reputational value with a metric (e.g., the metric 328 of FIG. 3) for identifying unreputed side effects. If a particular reputational value falls below a pre-defined threshold value, then a corresponding side effect is considered to be an unreputed side effect.

At step 414, a malicious signature is determined. In some embodiments, a determination module (e.g., the determination module 322 of FIG. 3) correlates the unreputed portions of the application activity in order to identify side effects that occurred on each and every one of the infected computers. For example, the determination module computes an intersection between groupings of the unreputed side effects in which each grouping is associated with a particular infected computer. As explained further below, the determination module distributes the intersecting side effects amongst the user computers for the purpose of detecting malware (e.g., the malware 112 of FIG. 1) and malware variants. At step 416, the method 400 ends.

Figure 5:
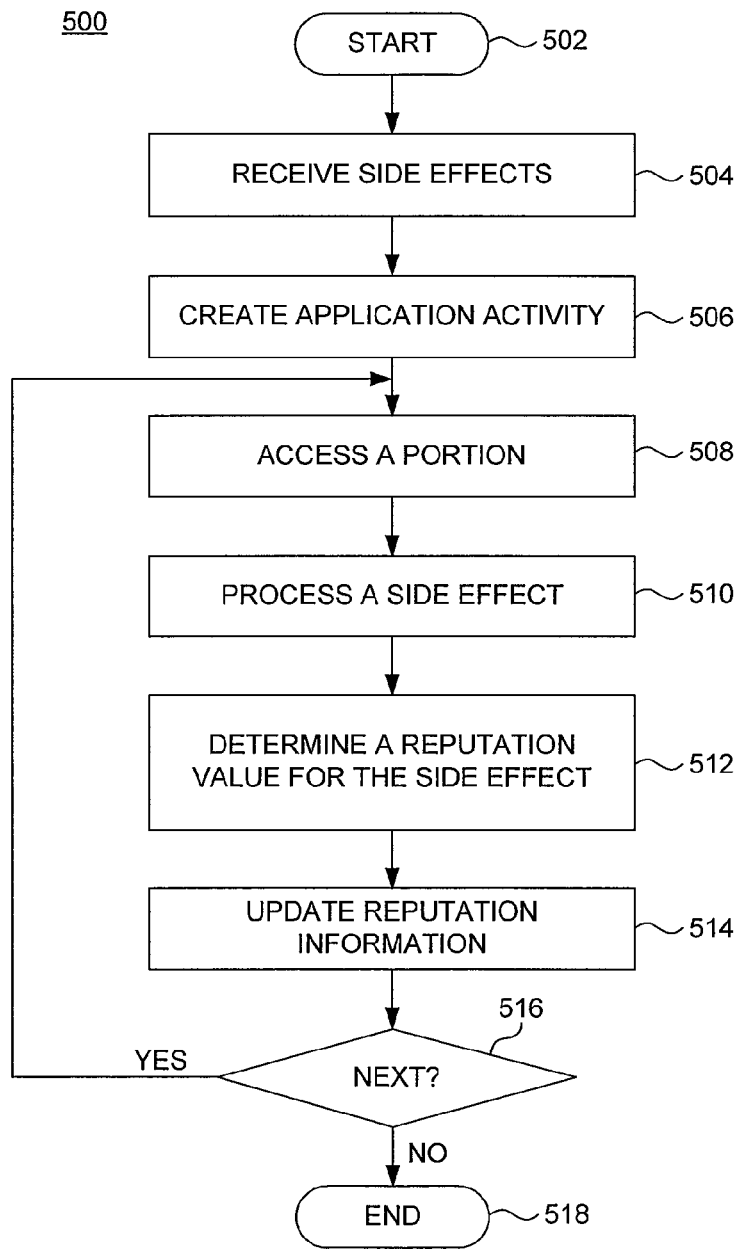
FIG. 5 is a method for generating reputation information associated with application activity at a plurality of computers, according to one or more embodiments.

FIG. 5 is a method 500 for generating reputation information associated with application activity at a plurality of computers, according to one or more embodiments. In some embodiments, a monitoring module cooperates with a generation module to perform each and every step of the method 500 as explained further below.

The method 500 starts at step 502 and proceeds to step 504. At step 504, side effects are received. At step 506, application activity is created. In some embodiments, a plurality of user computers report side effects associated with malicious infections to the monitoring module (e.g., the monitoring module 316 of FIG. 3), which aggregates and stores the side effects (e.g., the side effects 114 of FIG. 1) in memory (e.g., the memory 306 of FIG. 3) as the application activity (e.g., the application activity 312 of FIG. 1).

At step 508, a portion of the application activity is accessed. At step 510, a side effect is processed. In some embodiments, the generation module (e.g., the generation module 318 of FIG. 3) examines each and every portion of the application activity to assess reputations for the side effects.

At step 512, a reputation value for the side effect is determined. In some embodiments, the generation module examines the side effect and assigns the reputation value. At step 514, reputation information is updated.

At step 516, a determination is made as to whether there are more application activity portions requiring reputation values. If there are more application activity portions, the method 500 returns to step 508. If a certain portion of the application activity lacks a reputation, the generation module proceeds to assign a reputational value as shown for steps 508 to 514. If, on the other hand, there are no more application activity portions, the method 500 proceeds to step 518. At step 518, the method 500 ends.

Figure 6:
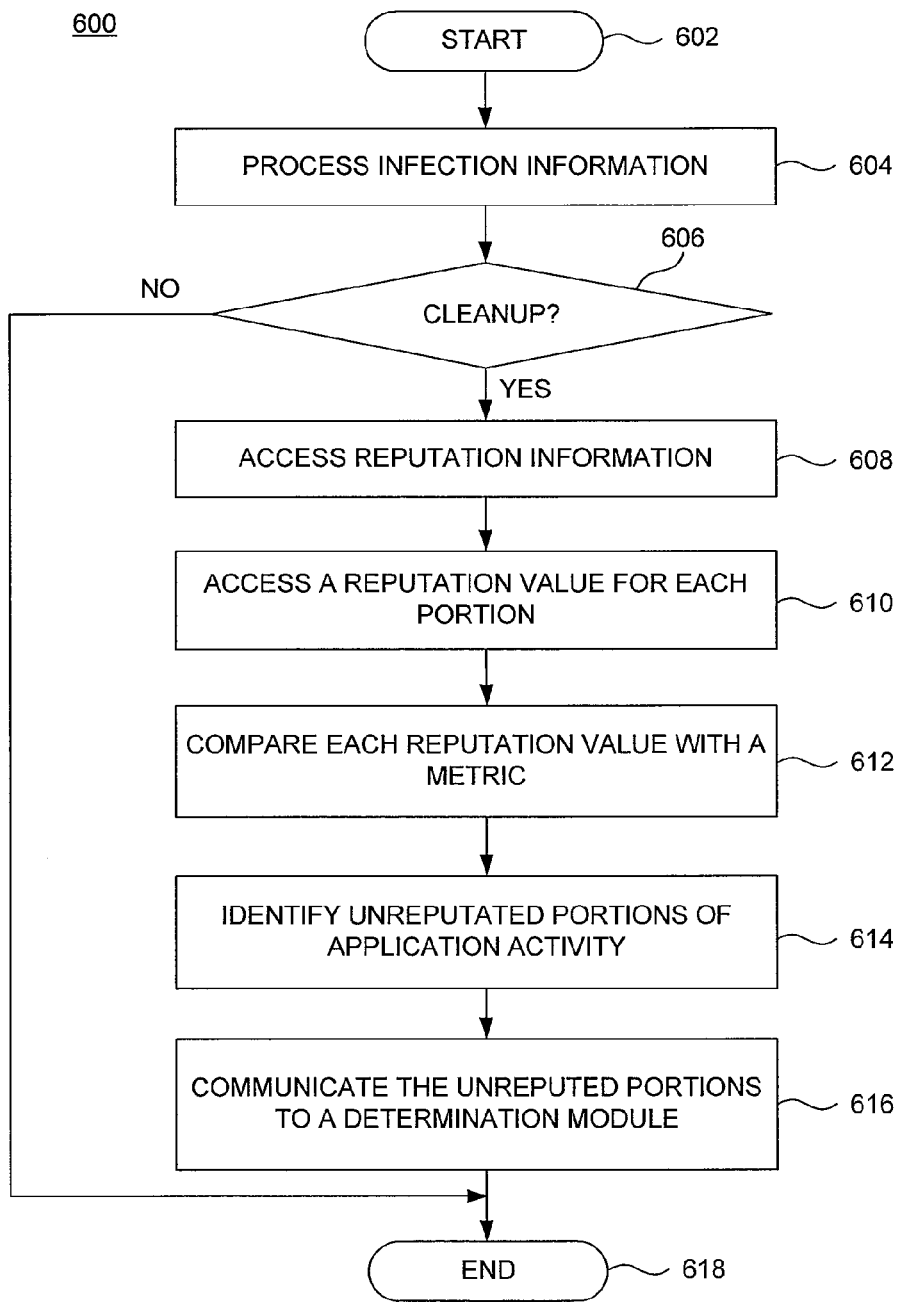
FIG. 6 is a method for examining reputation information to access unreputed portions of application activity, according to one or more embodiments.

FIG. 6 is a method 600 for examining reputation information to access unreputed portions of application activity, according to one or more embodiments. In some embodiments, an examination module (e.g., the examination module 320 of FIG. 3) performs each and every step of the method 600 as explained further below.

The method 600 starts at step 602 and proceeds to step 604. At step 604, infection information (e.g., the infection information 326 of FIG. 3) is processed. At step 606, a determination is made as to whether a cleanup action is to be performed. If the cleanup action is to be performed based on the infection information, the method 600 proceeds to step 608. In some embodiments, the infection information indicates a number of user computers that are infected with malware. If such a number exceeds a pre-defined threshold, the examination module initiates the cleanup action during which a malicious signature for detecting malware is produced. If, on the other hand, the cleanup action is not to be performed, the method 600 proceeds to step 618.

At step 608, reputation information is accessed. At step 610, a reputation value for each portion of application activity is accessed. In some embodiments, the examination module ascertains the reputation value of each side effect that occurred on an infected computer. At step 612, each reputation value is compared with a metric (e.g., the metric 328 of FIG. 3). At step 614, one or more unreputed portions of the application activity are identified. In some embodiments, the examination module compares the each reputation value with a pre-defined threshold value such that any side effect having a reputation value below such a threshold value is deemed to be unreputed. The examination module designates these side effects as unreputed portions of the application activity. At step 616, the unreputed portions are communicated to a determination module. At step 618, the method 600 ends.

Figure 7:
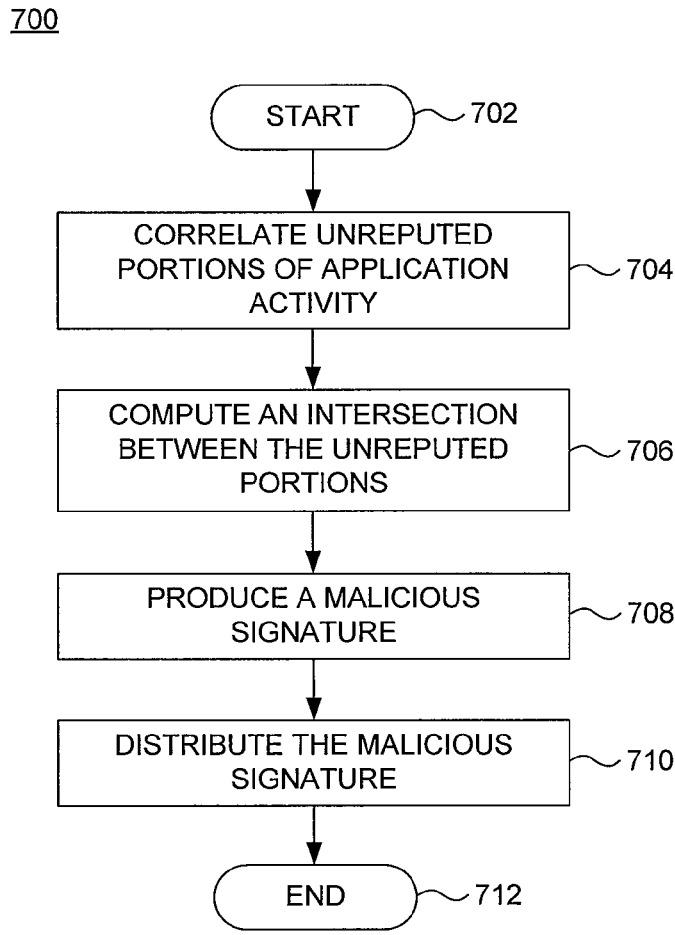
FIG. 7 is a method for determining a malicious signature based on unreputed portions of application activity, according to one or more embodiments.

FIG. 7 is a method 700 for determining a malicious signature based on unreputed portions of application activity, according to one or more embodiments. In some embodiments, a determination module performs each and every step of the method 700 as explained further below.

The method 700 starts at step 702 and proceeds to step 704. At step 704, unreputed portions of the application activity are correlated. At step 706, an intersection is computed between the unreputed portions. In some embodiments, each unreputed portion includes one or more side effects that occurred on a user computer infected with malware (e.g., the malware 112 of FIG. 1). The determination module identifies a grouping of side effects that intersect the unreputed portions. In some embodiments, such an intersection includes one or more side effects that occurred on each and every infected user computer. Because the intersecting side effects appear alongside each malicious infection, same or similar malicious software code most likely infected each and every one of the infected user computers. Accordingly, the intersecting side effects may be used to identify the malware causing the malicious infections as well as any existing or unknown malware variants.

At step 708, a malicious signature is produced. In some embodiments, the determination module uses the intersecting side effects to create the malicious signature. At step 710, the malicious signature is distributed. In some embodiments, the determination module communicates the malicious signature throughout a system of user computers. As explained for FIG. 8, the malicious signature may be used to detect the malware and/or the malware variants. At step 712, the method 700 ends.

Figure 8:
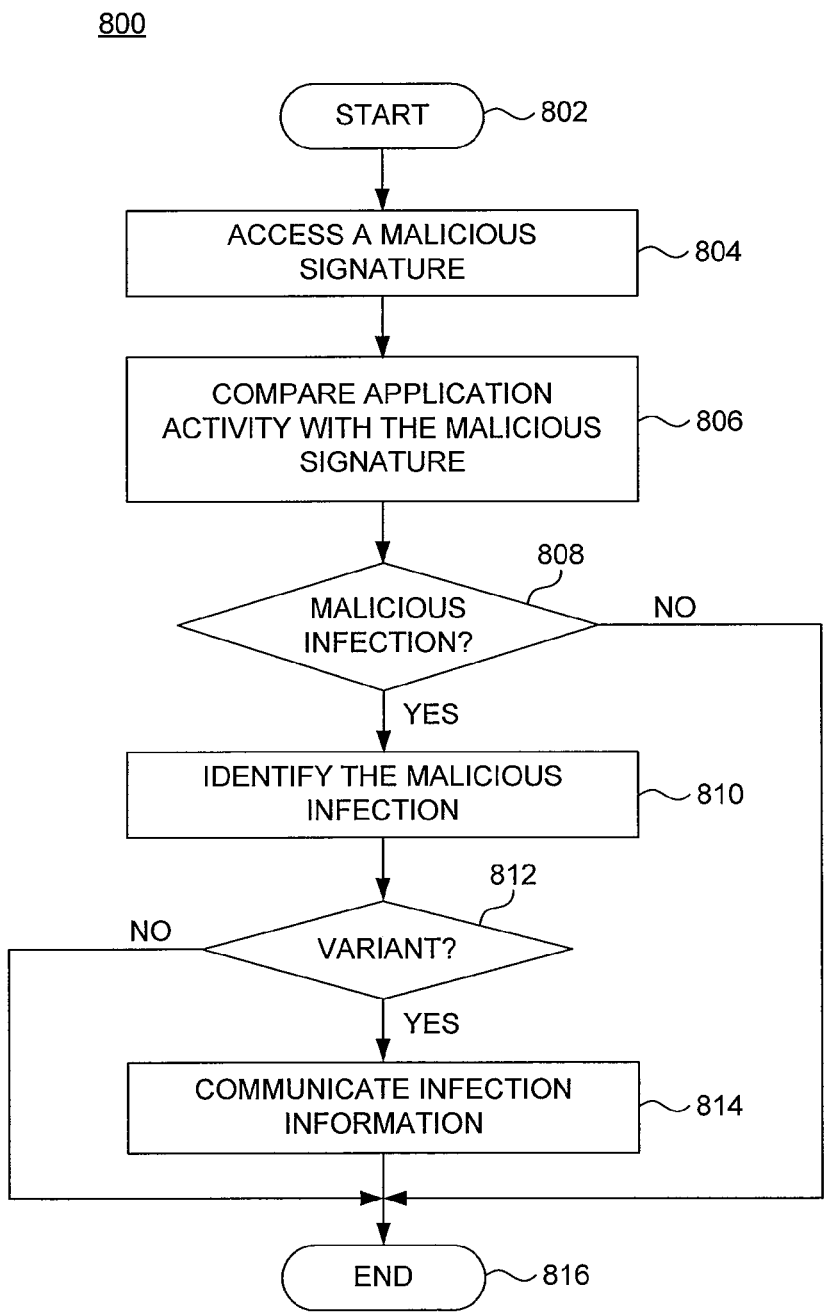
FIG. 8 is a method for identifying a malicious infection at another computer using a malicious signature, according to one or more embodiments.

FIG. 8 is a method 800 for identifying a malicious infection at another computer using a malicious signature, according to one or more embodiments. In some embodiments, a determination module (e.g., the determination module 322 of FIG. 3) performs each and every step of the method 800 as explained further below. Alternatively, security software (e.g., the security software 110 of FIG. 1) running in a user computer may perform the method 800.

The method 800 starts at step 802 and proceeds to step 804. At step 804, a malicious signature (e.g., the malicious signature 324 of FIG. 3) is accessed. At step 806, side effects are compared with the malicious signature. The malicious signature includes a grouping of side effects that identify malware as well as any known or unknown malware variants. In some embodiments, the security software accesses local side effects (e.g., the side effects 114 of FIG. 1) for comparison with the grouping of side effects. In some embodiments, the determination module accesses application activity (e.g., the application activity 312 of FIG. 3) that is received from one or more user computers to perform the same comparison. Such application activity includes side effects that occurred on the one or more user computers.

At step 808, a determination is made as to whether a malicious infection occurred on one or more computers. If malicious code infected the one or more computers, the method 800 proceeds to step 810. If, on the other hand, none of the computers are infected with the malicious code, the method 800 proceeds to step 816. At step 810, the malicious infection is identified. In some embodiments, the security software and/or the determination module identify the malware causing such an infection. At step 812, a determination is made as to whether a variant of the malware infected the one or more computers. If the malware variant caused the malicious infection, then the method 800 proceeds to step 814. If, on the other hand, the malicious infection was not caused by any of the malware variants, the method 800 proceeds to step 816. At step 814, infection information is communicated. At step 816, the method 800 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for performing a reputation based analysis on a malicious infection to secure a computer, comprising:
    monitoring, using at least one processor, application activity occurring at computers;
    generating, using at least one processor, reputation information associated with the application activity;
    in response to a malicious infection to at least one of the computers, examining, using at least one processor, the reputation information from memory to access unreputed portions of the application activity that occurred at the at least one of the computers; and
    determining, using at least one processor, a malicious signature based on the unreputed portions of the application activity by at least transforming the application activity and the reputation information into the malicious signature, wherein the malicious signature comprises information for identifying malware or malware variants and a grouping of side effects associated with the identified malware or malware variants.

2. The method of claim 1, wherein generating the reputation information further comprises determining a reputation value for each side effect of the application activity.

3. The method of claim 1, wherein examining the reputation information further comprises comparing each reputation value of the reputation information with a metric for evaluating the application activity to identify the unreputed portions of the application activity.

4. The method of claim 1, wherein determining the malicious signature further comprises distributing the malicious signature amongst the computers, wherein the malicious signature is used to detect malware variants.

5. The method of claim 1, wherein determining the malicious signature further comprises identifying the malicious infection at another computer based on the malicious signature.

6. The method of claim 1, wherein the malicious signature comprises an intersection between the unreputed portions of the application activity.

7. An apparatus for performing a reputation based analysis on a malicious infection to secure a computer, comprising:
    the one or more processors configured to:
        monitor application activity occurring at computers;
        generate reputation information associated with the application activity;
        examine the reputation information, in response to a malicious infection to at least one of the computers, to access unreputed portions of the application activity that occurred at the at least one of the computers; and
        transform the application activity and the reputation information into the malicious signature by at least correlating the unreputed portions of the application activity to produce a malicious signature, wherein the malicious signature comprises information for identifying malware or malware variants and a grouping of side effects associated with the identified malware or malware variants.

8. The apparatus of claim 7 wherein the one or more processors is further configured to determine a reputation value for each side effect of the application activity.

9. The apparatus of claim 7 wherein the one or more processors is further configured to compare each reputation value of the reputation information with a metric for evaluating the application activity to identify the unreputed portions of the application activity.

10. The apparatus of claim 7 wherein the one or more processors is further configured to distribute the malicious signature amongst the computers, wherein the malicious signature is used to detect malicious software variants.

11. The apparatus of claim 7 wherein the one or more processors is further configured to identify the malicious infection at another computer based on the malicious signature.

12. A non-transitory computer-readable-storage medium comprising one or more processor-executable instructions that, when executed by at least one processor, causes the at least one processor to:
- monitor application activity occurring at computers;
- generate reputation information associated with the application activity;
- examine the reputation information, in response to a malicious infection to at least one of the computers, to access unreputed portions of the application activity that occurred at the at least one of the computers; and
- determine a malicious signature based on the unreputed portions of the application activity, wherein the malicious signature is used to detect variants of the malicious infection and wherein determining a malicious signature comprises at least transforming the application activity and the reputation information into the malicious signature, wherein the malicious signature comprises information for identifying malware or malware variants and a grouping of side effects associated with the identified malware or malware variants.

13. The computer-readable-storage medium of claim 12 further comprising one or more processor-executable instructions that, when executed by the at least one processor, causes the at least one processor to:
- distribute the malicious signature amongst the computers, wherein the malicious signature is used to detect malicious software variants.

14. The computer-readable-storage medium of claim 12 further comprising one or more processor-executable instructions that, when executed by the at least one processor, causes the at least one processor to:
- identify the malicious infection at another computer based on the malicious signature.

15. The computer-readable-storage medium of claim 12 further comprising one or more processor-executable instructions that, when executed by the at least one processor, causes the at least one processor to:
- compare each reputation value of the reputation information with a metric for evaluating the application activity to identify the unreputed portions of the application activity.

16. The computer-readable-storage medium of claim 12 further comprising one or more processor-executable instructions that, when executed by the at least one processor, causes the at least one processor to:
- correlate the unreputed portions of the application activity to produce the malicious signature.

17. The computer-readable-storage medium of claim 12 further comprising one or more processor-executable instructions that, when executed by the at least one processor, causes the at least one processor to:
- compute an intersection between the unreputed portions of the application activity.

* * * * *